C. CUMMINGS.
Tools for Turning Metal.

No. 161,007.  Patented March 23, 1875.

Witnesses
Jno. L. Borne
C. M. Richardson

Inventor
Charles Cummings
by Dewey & Co
Attys

UNITED STATES PATENT OFFICE.

CHARLES CUMMINGS, OF VIRGINIA CITY, NEVADA.

IMPROVEMENT IN TOOLS FOR TURNING METAL.

Specification forming part of Letters Patent No. 161,007, dated March 23, 1875; application filed January 23, 1875.

*To all whom it may concern:*

Be it known that I, CHARLES CUMMINGS, of Virginia City, Storey county, State of Nevada, have invented an Improved Stationary Cutting and Planing Tool; and I do hereby declare the following description and accompanying drawings are sufficient to enable any person skilled in the art or science to which it most nearly appertains to make and use my said invention or improvement, without further invention or experiment.

My invention relates to an improvement in the construction of such stationary tools for cutting and planing metal as are used on lathes, planers, shapers, slotting-machines, and other like machines; and it consists in constructing a shank to be held in the tool-post, with a countersink, and the circular cutter on one side with a conical hub or boss to fit the countersink, as hereinafter described.

In order to explain my invention so that others will understand its nature, reference is had to the accompanying drawing forming a part of this specification, in which—

Figure 1:
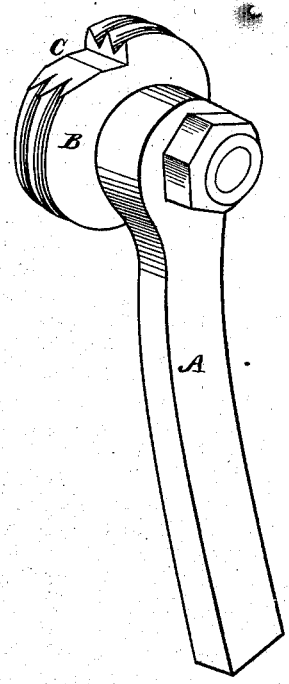
Figure 2:
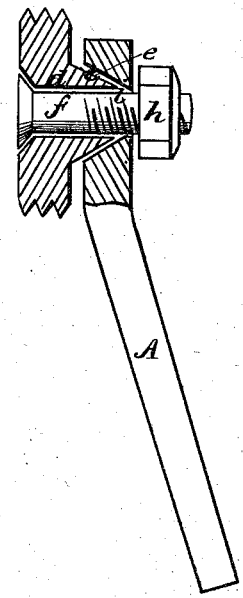

Figure 1 is a perspective view of my tool. Fig. 2 is a sectional view.

A is a stationary bar or tool-holder, such as is used on lathes, planing-machines, slotting-machines, and other like machines for holding the cutting or planing tool. The tool which I use consists of a circular metal plate, B, the rim of which can be made into any desired shape, according to the style of groove or cut it is desired to make. Across the rim of this circular plate there is usually cut a notch or recess, C, so that one edge of the notch or recess will form a cutting-bit, as shown. This circular plate or tool has a hole, *d*, through its center, and a conical boss or hub, *e*, upon one side, through which the central hole passes, while the opposite side of the plate is countersunk around the hole. To secure this tool to the bar A I bore a hole, K, through the head of the bar, and countersink one side, as at *i*, so that the conical hub or boss *e* of the plate B will fit partially into it, the notch or bit C being in the proper position to serve as a cutting or planing bit. I then pass a bolt, *f*, through the hole in the plate B, boss *e*, and head of the bar, and tighten it by means of a nut, *h*, which screws upon the end of the bolt on the opposite side of the bar A, so as to draw the conical hub tightly into the conical recess and fasten the plate in place by friction, which mode of fastening not only holds the cutter securely, but admits of the nicest possible degree of adjustment whenever required, especially after sharpening the tool by grinding away more of the circumference, as is the usual custom. The head of the bolt is made to fit exactly in the countersink in the side of the plate, so that its end will be flush with the side of the plate, as shown.

I disclaim the combination of a circular cutter with a shank for insertion into the tool-post, such combination being old, as is proven by the patent to A. S. Libby, March 1, 1864, and several applications for patents which have been rejected; but What I do claim is—

The construction of the cutter with a conical boss and the shank with a countersunk hole, whereby, by means of the bolt and nut, the cutter is securely held from turning while at work, and a perfect degree of adjustment is permitted.

In witness whereof I hereunto set my hand and seal.

CHARLES CUMMINGS. [L. S.]

Witnesses:
 GEO. H. STRONG,
 JNO. L. BOONE.